United States Patent [19]

Cuirassier et al.

[11] Patent Number: 4,918,139
[45] Date of Patent: Apr. 17, 1990

[54] AQUEOUS DISPERSIONS OF THERMALLY CROSS-LINKABLE POLYMERS BASED ON ALKYL (METH)ACRYLATE, THE PROCESS FOR THEIR PREPARATION AND THEIR USE IN PARTICULAR AS BINDERS AND/OR IMPREGNATION AGENTS

[75] Inventors: Fernand Cuirassier, Saint Denis-Fr; Didier Wilheim, Issy les Moulineaux; Alain Blanc, Paris, all of France

[73] Assignee: Societe Francaise Hoechst of Tour Roussel-Hoechst, Puteaux, France

[21] Appl. No.: 332,136

[22] Filed: Apr. 3, 1989

[30] Foreign Application Priority Data

Apr. 13, 1988 [FR] France ................ 88 04883

[51] Int. Cl.$^4$ ............ C08F 20/56; C08F 24/00
[52] U.S. Cl. ................. 524/813; 524/829; 524/831; 526/266; 526/270; 526/304
[58] Field of Search .......... 524/229, 831, 813; 526/304, 266, 270; 525/328.2

[56] References Cited

FOREIGN PATENT DOCUMENTS 2595694 3/1986 France .

Primary Examiner—C. Warren Ivy
Assistant Examiner—Jeffrey T. Smith
Attorney, Agent, or Firm—Browdy and Neimark

[57] ABSTRACT

These aqueous dispersions contain a copolymerizate containing 90 to 99% by weight of repeating units resulting from the polymerization of a mixture of monomers (a) based on 0.1 to 10% by weight of alpha,beta-ethylenic mono- and/or di-carboxylic $C_3$-$C_5$ acid and/or their amides, 0 to 10% by weight of styrene and/or acrylonitrile, the remainder of the esters of (meth)acrylic acid with $C_1$-$C_{12}$ alkanols; and 10 to 1% by weight of repeating units of general formula (I)

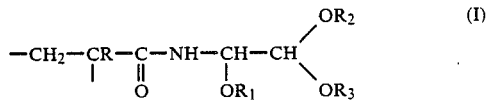

where R=H or —$CH_3$, $R_1$=H or $C_1$-$C_4$ alkyl and $R_2$ and $R_3$=$C_1$-$C_8$ alkyl or a —$CH_2$—$CR_4R_5$—$(CH_2)_n$— group in which n=0 or 1 and $R_4$ and $R_5$=H or —$CH_3$.

9 Claims, No Drawings

AQUEOUS DISPERSIONS OF THERMALLY CROSS-LINKABLE POLYMERS BASED ON ALKYL (METH)ACRYLATE, THE PROCESS FOR THEIR PREPARATION AND THEIR USE IN PARTICULAR AS BINDERS AND/OR IMPREGNATION AGENTS

The present invention concerns new aqueous dispersions of thermally cross-linkable polymers based on alkyl (meth)acrylate, the process for their preparation and their use in particular as binders and/or impregnation agents.

At present there are used as binders and/or impregnation agents aqueous dispersions of thermally cross-linkable polymers based on alkyl (meth)acrylate, in which the cross-linking is effected by functional derivatives of (meth)acrylamide such as N-methylol(meth)acrylamide, arylamido-glycolic acid, methyl acryloylamino-2 methoxy-2 acetate. But these monomers, when used, release fairly considerable quantities of formaldehyde. Now, for reasons of safety and comfort, binding agents and/or impregnation agents have for a very long time been sought, which, when used, lead to finished products which give complete satisfaction both as regards washing and as regards dry-cleaning and which, either during application or when put into use, do not give off any smell of formaldehyde.

In order to respond to this need, the Applicant has discovered new aqueous dispersions of thermally cross-linkable polymers based on alkyl (meth)acrylate, which can be used as binders and/or impregnation agents which are stable on washing and dry-cleaning, and which do not release any trace of formaldehyde, either when applied or when articles containing them are used.

The aqueous dispersions of thermally cross-linkable copolymers according to the present invention contain a copolymer prepared in an aqueous emulsion containing:

90 to 99% by weight of repeating units resulting from the polymerization of a mixture of main monomers (a) consisting of 0.1 to 10% by weight of alpha,beta-ethylenic mono- and/or dicarboxylic $C_3$–$C_5$ acids and/or their amides, of 0 to 10% by weight of styrene and/or acrylonitrile and the remainder up to 100% of the esters of acrylic acid and/or methacrylic acid with $C_1$–$C_{12}$ alkanols;

10 to 1% by weight of repeating units of general formula (I)

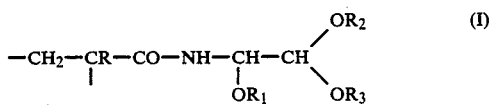

which can be derived from the polymerization of monomers (b) of general formula (II)

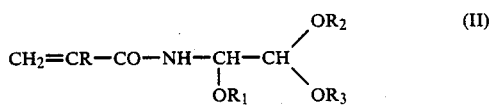

where R represents a hydrogen atom or a methyl radical, $R_1$ represents a hydrogen atom or a $C_1$–$C_4$ alkyl radical, and $R_2$ and $R_3$ are either identical and then each represents a $C_1$–$C_8$ alkyl group, or together form a group: $-CH_2-CR_4R_5-(CH_2)_n-$ in which $n=0$ or 1 and $R_4$ and $R_5$, identical or different, represent a hydrogen atom or a methyl group.

The subject of the invention is therefore, in particular, aqueous dispersions of thermally cross-linkable copolymers containing a copolymerizate prepared in aqueous emulsion, based on:

(a) 90 to 99% by weight, that is as main monomers, of a mixture consisting of 0.1 to 1.0% by weight of alpha,-beta-ethylenic mono- and/or di-carboxylic $C_3$–$C_5$ acids, and/or their amides, of 0 to 10% by weight of styrene and/or acrylonitrile and the remainder up to 100% of esters of acrylic acid and/or methacrylic acid with $C_1$–$C_{12}$ alkanols;

(b) 10 to 1% by weight of monomers of general formula (II).

The subject of the invention is more particularly aqueous dispersions as defined above, characterized in that the copolymerizate prepared in aqueous emulsion is based on:

92 to 98% by weight of a mixture of 95 to 99.8 parts of esters of acrylic acid and/or of methacrylic acid with C alkanols and of 0.2 to 5 parts of acrylic acid, methacrylic acid, acrylamide and/or methacrylamide;

2 to 8% by weight of monomers of general formula (II).

Among the latter products, the subject of the invention is in particular copolymerizates prepared in aqueous emulsion based on: 92 to 98% by weight of a mixture of 95 to 99.8 parts of methyl (meth)acrylate, of ethyl (meth)acrylate, of n-butyl (meth)-acrylate and of 0.2 to 5 parts of acrylic acid and/or acrylamide;

2 to 8% by weight of monomers of general formula (II).

These copolymers are prepared by standard polymerization of an aqueous emulsion of the monomers, advantageously carried out at a buffered pH of between 6 and 8. They are present in the aqueous dispersions of the present invention in the form of dispersed particles the average dimensions of which are about 200 nm. These dispersions possess in general a content of copolymers of this type of 30 to 65% by weight and preferably of 40 to 55% by weight.

The monomers of general formula (II) are known from French Patent Application No. 2 595 694 and among these there can be more particularly mentioned N-(2,2-dialkoxy 1-hydroxy ethyl)-(meth)acrylamide and N-(1,2,2-trialkoxy ethyl)-(meth)acrylamide in which the term alkoxy means a $C_1$-$C_4$ alkoxy radical such as N-(2,2-dimethoxy 1-hydroxy ethyl)-acrylamide, hereafter called DMHEA, N-(2,2-dimethoxy 1-hydroxy ethyl)-methacrylamide, DMHEMA, N-(1,2,2-trimethoxy ethyl)-acrylamide, TMEA, N-(1,2,2-trimethoxy ethyl)-methacrylamide, TMEMA, N-(2,2-dibutoxy 1-hydroxy ethyl)-acrylamide, DBHEA, N-(2,2-dibutoxy 1-hydroxy ethyl-methacrylamide, DBHEMA, N-(1,2,2-tributoxy ethyl)-acrylamide, TBEA, N-(1,2,2-tributoxy ethyl)-methacrylamide, TBEMA. These products are available in the form of colorless crystals except for DMHEA and TBEMA which are colorless liquids. Some physical constants of these monomers are given in Table III below.

As esters of acrylic and/or methacrylic acid with $C_1$–$C_{12}$ alkanols, there can be mentioned in particular methyl acrylate and methyl methacrylate, ethyl acrylate and ethyl methacrylate, n-butyl acrylate and n-butyl methacrylate, isobutyl acrylate and isobutyl methacrylate, 2-ethyl hexyl acrylate and 2-ethyl hexyl methacrylate, 2-hydroxy propyl acrylate and 2-hydroxy propyl methacrylate, dodecyl acrylate and dodecyl methacrylate.

As alpha,beta-ethylenic mono- and di-carboxylic $C_3-C_5$ acid, besides acrylic and methacrylic acids, there can in particular be mentioned itaconic acid.

As alpha,beta-ethylenic mono- and di-carboxylic $C_3-C_5$ acid amide, there can in particular be mentioned acrylamide and methacrylamide.

The aqueous dispersions of thermally cross-linkable copolymers of the present invention can be prepared by standard copolymerization in an aqueous emulsion of the mixture of main monomers (a) and monomers (b) of general formula (II) in the indicated proportions using polymerization initiators which generate free radicals, emulsifying and/or dispersing agents as well as, optionally, transfer agents.

As appropriate polymerization initiators, there can be mentioned, for example, hydrogen peroxide, sodium, potassium or ammonium peroxydisulfate, acyl hydroperoxides, alkyl hydroperoxides. The proportion of initiator varies in general from 0.01 to 5% by weight referred to the weight of the monomers. The above-mentioned peroxy compounds can also be made to work in combination with reducing agents, such as redox catalysts. As examples of appropriate reducing agents, there can be cited alkali metal disulfites, alkali metal or ammonium hydrogensulfites, alkali metal thiosulfates, ascorbic acid, ferrous sulfates. When using redox catalysts, it is often an advantage to use promoters such as salts of: copper, manganese, iron, cobalt and/or nickel.

As emulsifying agents, anionic and/or non-ionic emulsifying agents are normally used, such as for example $C_6-C_{18}$ fatty acids, $C_4-C_{18}$ aliphatic alkanol sulfates, $C_{10}-C_{18}$ alkylsulfonates, $C_{10}-C_{18}$ alkylarylsulfonates, $C_4-C_{18}$ hydroxyalkylsulfonates, alkali metal and ammonium salts of sulfosuccinic esters, addition products or sulfonated adducts of ethylene oxide with aliphatic alkanols, aliphatic amides, fatty acids or alkylphenols. The proportion of emulsifying agents and/or dispersing agents varies in general from 0.1 to 10% and preferably from 1 to 6% by weight referred to the weight of the monomers.

As transfer agents, there can be cited in particular, carbon tetrachloride, isopropyl alcohol, dodecanol, paratertbutylthiophenol and dodecanethiol.

The emulsion polymerization is carried out, in general, at temperatures of 20° to 95° C., preferably of 60° to 85° C., at a pH of between 2 and 9, advantageously between 5 and 8.

According to an advantageous method, the polymerization is carried out in a buffered medium, such as for example in the presence of an alkali metal salt of a weak acid, such as sodium acetate or sodium hydrogencarbonate. The polymerization is generally carried out by the slow addition of an aqueous pre-emulsion containing the monomers, the emulsifying and/or dispersing system, the initiator, and optionally a transfer agent and a buffering agent in an agitated aqueous phase, maintained at a temperature between 60° and 85° C. and optionally containing a polymerization initiator in solution.

According to a particular method of procedure, the copolymerizates containing repeating units of general formula (I) in which $R_1$ is a hydrogen atom, that is, repeating units of general formula (III)

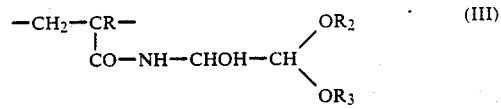

in which R, $R_2$ and $R_3$ have the previously indicated meaning, obtained from copolymers bearing carbamoyl groups, by reacting the copolymers prepared in an aqueous emulsion containing in polymeric binding, on the one hand the above mentioned main monomers (a) in the previously-stated proportions, and on the other hand acrylamide and/or methacrylamide, in appropriate equivalent quantities with a glyoxal monoacetal of general formula (IV)

in which $R_2$ and $R_3$ have the previously indicated meaning, during which reaction equivalent, larger or smaller amounts of glyoxal monoacetal of general formula (IV) in relation to the (meth)acrylamide incorporated by polymerization can be made to react, so as to obtain the desired number of repeating units of general formula (III). Furthermore, copolymers can also be obtained containing recurring repeating units of general formula (III) by polymerizing a mixture of monomers (a) containing acrylamide and/or methacrylamide in an aqueous emulsion, in the presence of glyoxal monoacetal of general formula (IV).

When carrying out the process for obtaining the aqueous dispersions according to the present invention which contain a copolymerizate having repeating units of general formula (III), there can, during the copolymerization in an aqueous emulsion, be used acrylamide or methacrylamide in equivalent proportions instead of monomers of general formula (II) and there can be introduced, either in the aqueous phase, or in the pre-emulsion, or in the reaction medium during polymerization, or at the end of polymerization, a glyoxal monoacetal of general formula (IV) in stoichiometric or non-stoichiometric proportions relative to the (meth)acrylamide present.

When the glyoxal monoacetal of general formula (IV) is introduced directly into the reaction medium, on the one hand this introduction is carried out slowly, either as the polymerization progresses, separately from or simultaneously with the introduction of the pre-emulsion, or after the introduction of the monomers, and on the other hand the pH of the reaction mixture is buffered and it is advantageously regulated at a value between 6.8 and 8.

The aqueous dispersions of copolymers according to the present invention can be used as binders and/or impregnation agents for various woven or non-woven textile goods, for printing pastes for textiles, for matt surfaces of mineral or natural and/or synthetic organic fibers, or for compositions for coating paper. In these applications, the aqueous dispersions of copolymers according to the present invention can also contain standard additives for this type of application such as, for example, pigments, coloring, antioxidizing agents, preserving agents, plasticizers, film-forming agents, and thermally cross-linking catalysts, in the usual quantities.

The application as a binder of the aqueous dispersions according to the present invention can be carried out by putting into operation a standard process such as impregnation, foularding, printing, or spraying, followed by the elimination of the excess binder for example by squeezing, then by drying and finally by heating the treated article for a few minutes, generally for 0.5 to 15 minutes, at temperatures of 110° to 250° C. The drying is carried out over 1 to 10 minutes at temperatures of 100° to 170° C. In general, a proportion of the dispersions of the present invention is used such that the finished article has a copolymer content of 3 to 60% by weight.

The following examples illustrate the invention without however limiting it.

The parts and percentages which appear in the preceding description and the examples which follow relate to weight.

EXAMPLES 1-9

An emulsion is prepared by mixing, at ambient temperature,:
459 g of a monomer mixture containing in proportions by weight:
  x % of butyl acrylate
  y % of ethyl acrylate
  z % of methyl methacrylate
  q % of acrylic acid
  p % of monomer (b) of general formula (I)
18 g of an emulsifying mixture consisting in proportions by weight of:
  37.5% of ethoxylated nonylphenol with 30 moles of ethylene oxide
  37.5% of ethoxylated oleocetyl alcohol with 25 moles of ethylene oxide
  25% of sodium laurylethersulfate
1 g of sodium hydrogencarbonate
1.2 g of sodium peroxydisulfate
270.8 g of water.

This emulsion, having a pH of 4.65, is then introduced over 4 hours under agitation into 250 g of water kept at 80°±2° C.

After the emulsion has been introduced, the reaction medium is cooled to ambient temperature and filtered to eliminate if necessary any mechanical impurities then, if necessary, its pH is adjusted to 5.7±0.2.

1000 g of a dispersion is thus obtained possessing the characteristics given in Table I, in which the abbreviations used have the following meanings:

DE: dry extract expressed as a percentage by weight and determined by drying 1 g of dispersion over 3 hours at 105° C.;

V: Brookfield viscosity expressed in mPa.s and determined at ambient temperature with a Brookfield RVT viscosimeter fitted with an axis, ax, of 1 to 5, turning at a speed of 100 revolutions per minute;

Dz: size of particles (average of the order of z) expressed in nanometers;

SR: swelling rate, determined at ambient temperature by immersion in trichloroethylene of a 50 mm diameter flat circular test piece cut from a dry film, of about 0.5 mm thickness, of the dispersion under test. The swelling rate is measured simultaneously on a thermally-untreated film, $SR_b$, and on a film treated for 10 minutes at 150° C., $SR_t$. It is calculated by the relationship:

$$SR = \frac{fd - id}{id} \times 100$$

in which id is the initial diameter of the test piece and fd is its final diameter;

Tg: vitreous transition temperature expressed in degrees Celsius and determined by differential thermal analysis on a film of the dispersion under test;

I': index of polydispersity in size;

Ex: number of examples;

Lf: level of free formaldehyde determined by high performance chromatography on a sample of the dispersion.

EXAMPLES 10-13

An emulsion is prepared by mixing at ambient temperature:
471.2 g of a monomer mixture containing in proportions by weight:
  x % of butyl acrylate
  y % of ethyl acrylate
  z % of methyl methacrylate
  q % of acrylic acid
  p % of monomer (b) of general formula (II)
  s % of 2-hydroxy propyl methyacrylate, HPMA
21.6 g of an emulsifying mixture consisting in proportions by weight of:
  20.83% of sodium laurylethersulfate,
  47.92% of ethoxylated nonylphenol with 30 moles of ethylene oxide,
  31.25% of ethoxylated oleocetyl alcohol with 25 moles of ethylene oxide,
0.68 g of sodium acetate,
1.22 g of sodium peroxydisulfate,
5.03 g of water.

This pre-emulsion, having a pH of 5.75, is then introduced over 4 hours under agitation into 250 9 of water and 0.27 g of sodium peroxydisulfate kept at 80°±2° C.

After the emulsion has been introduced, the reaction medium is cooled to ambient temperature and filtered to eliminate if necessary any mechanical impurities, then, if necessary, the pH is adjusted to 5.7±0.2.

1020 g of a dispersion is thus obtained, having characteristics given in Table I for the dispersions which do not contain 2-hydroxy propyl methaorylate and in Table II for the others.

EXAMPLE 14

An emulsion is prepared by mixing at ambient temperature:
450 g of a monomer mixture containing in proportions by weight:
  21.05% of butyl acrylate
  21.05% of lauryl acrylate, LA
  52.40% of methyl methacrylate
  0.50% of acrylic acid
  5.0% of N-(2,2-dimethoxy 1-hydroxy ethyl)-methacrylamide, DMHEMA
18 g of an emulsifying mixture identical to that used in examples 1-9
1 g of sodium hydrogencarbonate
1.2 g of sodium peroxydisulfate
279.8 g of water.

This emulsion is then introduced over 4 hours under agitation into of water kept at 80°±2° C.

After the emulsion has been introduced, the reaction medium is cooled to ambient temperature and then filtered to eliminate if necessary any mechanical impurities.

1000 g of an aqueous dispersion is thus obtained having the characteristics given in table II.

EXAMPLE 15

An emulsion is prepared by mixing at ambient temperature:
  450 g of a monomer mixture containing in proportions by weight:
    56.3% (253.35 g) of ethyl acrylate
    7.9% (35.55 g) of butyl acrylate
    34.3% (154.35 g) of methyl methacrylate
    0.5% (2.25 g) of acrylic acid
    1.0% (4.5 g) of acrylamide
  21.6 g of an emulsifying mixture identical to that used in examples 10-13
  0.68 g of sodium acetate
  1.22 g of sodium peroxydisulfate
  266.23 g of water.

This pre-emulsion having a pH of 4.20 is then introduced over 4 hours under agitation into 250 g of water and 0.27 g of sodium peroxydisulfate kept at 80°±2° C. After the emulsion has been introduced, the pH of the reaction medium is adjusted to 8 by the addition of 5N sodium hydroxide, then under agitation, maintaining the temperature at 40°±2° C., 6.60 g (63 mmoles) of dimethoxyethanal in solution in 7.2 g of water, then the reaction mixture is left under agitation for one hour at 40° C., and then cooled to ambient temperature, and finally filtered.

1010 g of a dispersion is thus obtained, the copolymerizate of which is based, in proportions by weight, on 55.49% of ethyl acrylate, 33.8% of methyl methacrylate, 7.79% of butyl acrylate, 2.43% of DMHEA and 0.49% of acrylic acid. The characteristics of this dispersion are given in Table II.

COMPARISON EXAMPLES C1 AND C2

These two comparison Examples were carried out according to the process described for Examples 1-9 and the characteristics of the dispersions obtained are given in Table II on lines C1 and C2.

The copolymer of dispersion C1 is based only on butyl acrylate (42.1%), ethyl acrylate (57.40%) and acrylic acid (0.5%), and it provides a film which is totally soluble in trichloroethylene, even after heat treatment.

The copolymerizate of dispersion C2 is based on butyl acrylate (40.95%), ethyl acrylate (55.80%), acrylic acid (0.5%) and N-methylol acrylamide, NMA (2.75%), and the corresponding dispersion contains 550 ppm of free formaldehyde.

From what has been said above it can be seen that the aqueous dispersions of the invention are satisfactory and do not release any trace of formaldhyde.

It goes without saying that the present invention has been described only in a purely explanatory and non-limitative way and that any useful modification can be incorporated into it without going outside its scope.

TABLE I

| EX | Monomers | | | | | | DE | SR | | V | | Dz | I' | Tg | Lf |
| | x | y | z | q | (b) | p | | $SR_b$ | $SR_t$ | ax | | | | ppm |
|---|---|---|---|---|---|---|---|---|---|---|---|---|---|---|---|
| 1 | 41.27 | 0 | 56.27 | 0.5 | TMEA | 1.96 | 45.1 | sol. | 140 | 1 | 44.5 | 230 | 0.05 | 25 | 0 |
| 2 | 41.27 | 0 | 56.27 | 0.5 | TMEMA | 1.96 | 45.2 | sol. | 150 | 1 | 37 | 290 | 0.07 | 25.5 | 0 |
| 3 | 40.1 | 0 | 54.7 | 0.45 | DMHEA | 4.75 | 46.1 | 152 | 136 | 2 | 198 | 240 | 0.05 | 23.5 | 0 |
| 4 | 40.1 | 0 | 54.7 | 0.45 | DMHEMA | 4.75 | 48 | 132 | 150 | 1 | 66.5 | 270 | 0.21 | 26.5 | 0 |
| 5 | 39.15 | 0 | 53.4 | 0.45 | DMHEA | 7 | 48.1 | 110 | 98 | 5 | 2800 | 720 | 0.5 | 22.0 | 0 |
| 6 | 40.1 | 0 | 54.7 | 0.45 | DMHEA | 4.75 | 48.0 | 154 | 136 | 2 | 260 | 240 | 0.07 | 22.5 | 0 |
| 7 | 39.15 | 0 | 53.4 | 0.45 | DMHEMA | 7 | 48.1 | 110 | 110 | 1 | 97.5 | 190 | 0.03 | 33.5 | 0 |
| 8 | 39.15 | 0 | 53.4 | 0.45 | DMHEA | 7 | 45.1 | 150 | 140 | 2 | 216 | 290 | 0.10 | 23.5 | 0 |
| 9 | 7.7 | 75.0 | 11.6 | 0.5 | DMHEMA | 5.2 | 46.4 | 190 | 84 | 1 | 67.5 | 190 | 0.05 | −5.5 | 0 |
| 10 | 7.9 | 77.2 | 11.9 | 0.5 | DMHEA | 2.5 | 45.9 | 164 | 110 | 1 | 49.5 | 200 | 0.03 | −10.5 | 0 |
| 11 | 7.9 | 75.35 | 11.85 | 0.5 | DMHEA | 4.4 | 46.8 | 144 | 72 | 1 | 81.0 | 190 | 0.07 | −8 | 0 |
| 12 | 7.7 | 75.10 | 11.60 | 0.5 | DMHEMA | 5.1 | 48.0 | 168 | 62 | 1 | 77.5 | 190 | 0.04 | −7 | 0 |

Sol.: the test piece is soluble in trichloroethyl, which indicates the absence of cross-linking.

TABLE II

| EX | Monomers | | | | LA | | | NMA | | DE | SR | | V | | Dz | I' | Tg | Lf |
| | x | y | z | q | s | % | (b) | p | % | | $SR_b$ | $SR_t$ | ax | | | | | ppm |
|---|---|---|---|---|---|---|---|---|---|---|---|---|---|---|---|---|---|---|
| 13 | 7.43 | 72.22 | 11.19 | 0.47 | 3.76 | 0 | DMHEMA | 4.93 | 0 | 46.1 | 120 | 64 | 1 | 63 | 190 | 0.04 | −6 | 0 |
| 14 | 21.05 | 0 | 52.40 | 0.5 | 0 | 21.05 | DMHEMA | 5.0 | 0 | 46.25 | 124 | 128 | 1 | 91.5 | 142 | 0.02 | 13 | 0 |
| 15 | 7.79 | 55.49 | 33.80 | 0.49 | 0 | 0 | DMHEA | 2.43 | 0 | 45.96 | sol | 160 | 1 | 51.5 | 210 | 0.04 | 10 | 0 |
| C1 | 42.10 | 0 | 57.40 | 0.5 | 0 | 0 | | 0 | 0 | 45.9 | sol | sol | 1 | 61 | 170 | 0.02 | 23.5 | 0 |
| C2 | 40.95 | 0 | 55.80 | 0.5 | 0 | 0 | | 0 | 2.75 | 46.9 | 132 | 100 | 2 | 300 | 240 | 0.08 | 20.5 | 550 |

LA: Lauryl acrylate
NMA: N-methylol acrylamide

TABLE III

Physical characteristics of monomers of general formula (II)

| ABBREVIATION | R | $R_1$ | $R_2 = R_3$ | APPEARANCE | MELTING POINT |
|---|---|---|---|---|---|
| DMHEA | H | H | Me | liquid | |
| DMHEMA | Me | H | Me | colorless solid | 77° C. |
| DBHEA | H | H | nBu | colorless solid | 51° C. |
| DBHEMA | Me | H | nBu | colorless solid | 37° C. |
| TMEA | H | Me | Me | colorless solid | 70° C. |
| TMEMA | Me | Me | Me | colorless solid | 38° C. |
| TBEA | H | nBu | nBu | colorless solid | 38° C. |
| TBEMA | Me | nBu | nBu | liquid | |

We claim:

1. Aqueous dispersions of thermally cross-linkable copolymers based on alkyl (meth)acrylate, characterized in that they contain a copolymerizate prepared in an aqueous emulsion containing:
  90 to 99% by weight of repeating units resulting from the polymerization of a mixture of main monomers
    (a) consisting of 0.1 to 10% by weight of alpha,- beta-ethylenic mono- and/or di-carboxylic $C_3-C_5$ acids, and/or their amides, of 0 to 10% by weight of styrene and/or acrylonitrile and the remainder up to 100% of esters of acrylic acid and/or methacrylic acid with $C_1-C_{12}$ alkanols;

10 to 1% by weight of repeating units of general formula (I)

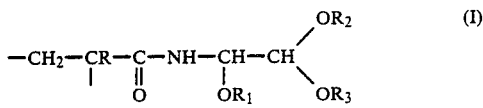

in which R represents a hydrogen atom or a methyl radical, $R_1$ represents a hydrogen or a $C_1-C_4$ alkyl radical, and $R_2$ and $R_3$ are either identical and then each represents a $C_1-C_8$ alkyl group, or together form a group $-CH_2-CR_4R_5-(CH_2)_n-$ in which n is 0 or 1 and $R_4$ and $R_5$, identical or different, represent a hydrogen atom or a methyl group.

2. Dispersions according to claim 1, characterized in that the copolymerizate contains:

92 to 98% by weight of repeating units resulting from the polymerization of a mixture of 95 to 99.8 parts of esters of acrylic acid and/or methacrylic acid with $C_1-C_{12}$ alkanols and of 0.2 to 5 parts of acrylic acid, methacrylic acid, acrylamide and/or methacrylamide and 2 to 8% by weight of repeating units of general formula (I).

3. Dispersions according to claim 1 characterized in that the copolymerizate contains:

92 to 98% by weight of repeating units resulting from the polymerization of a mixture of 95 to 99.8 parts of methyl (meth)-acrylate, ethyl (meth)acrylate, n-butyl (meth)acrylate, and of 0.2 to 5 parts of acrylic acid and/or acrylamide and 2 to 8% by weight of repeating units of general formula (I).

4. Dispersions according to claim 1 characterized in that in the general formula (I) R represents a hydrogen atom or a methyl radical, $R_1$ represents a hydrogen atom or a $C_1-C_4$ alkyl radical and $R_2$ and $R_3$, being identical, represent a $C_1-C_4$ alkyl radical.

5. Dispersions according to claim 4, characterized in that in the general formula (I), R and $R_1$, identical or different, represent a hydrogen atom or a methyl radical and $R_2$ and $R_3$ represent a methyl radical.

6. Dispersions according to claim 1 characterized in that the repeating unit of general formula (I) is of general formula (III)

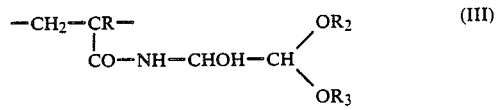

7. A dispersion according to claim 1 in the form of a binder.

8. A dispersion according to claim 1 in the form of an impregnation agent.

9. In a composition for the treatment of fibrous materials comprising a binder and additive materials, the improvement wherein said binder comprises a dispersion according to claim 1.

* * * * *